United States Patent
McLaughlin et al.

(10) Patent No.: US 7,374,222 B2
(45) Date of Patent: May 20, 2008

(54) FOLD IN FLOOR SEAT ASSEMBLY HAVING RETRACTING FRONT LEG LINKAGE ASSEMBLY

(75) Inventors: Matthew J. McLaughlin, Chesterfield Township, MI (US); Lei Cao, Farmington Hills, MI (US); Catherine A. DeVoss, Plymouth, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/593,888

(22) PCT Filed: Apr. 4, 2005

(86) PCT No.: PCT/CA2005/000497

§ 371 (c)(1),
(2), (4) Date: Sep. 21, 2006

(87) PCT Pub. No.: WO2005/095150

PCT Pub. Date: Oct. 13, 2005

(65) Prior Publication Data

US 2007/0273172 A1    Nov. 29, 2007

(51) Int. Cl.
*B60N 2/30* (2006.01)

(52) U.S. Cl. .............. 296/65.09; 296/65.05; 297/15

(58) Field of Classification Search ........... 296/63, 296/65.01, 65.05, 65.09, 65.16; 297/14, 297/15, 55, 325, 326, 327, 331, 335
See application file for complete search history.

(56) References Cited

U.S. PATENT DOCUMENTS 5,269,581 A * 12/1993 Odagaki et al. .............. 296/66
6,312,053 B1 * 11/2001 Magyar ...................... 297/367
6,375,255 B1 * 4/2002 Maruta et al. ................. 297/15
6,644,730 B2   11/2003 Sugiura et al.
6,682,120 B2    1/2004 Kamida et al.
6,837,530 B2 * 1/2005 Rudberg et al. ......... 296/65.09
6,869,138 B2    3/2005 Rhodes et al.
6,955,386 B2 * 10/2005 Rhodes et al. ........... 296/65.09
7,029,063 B2 * 4/2006 Holdampf ..................... 297/15
7,201,425 B2 * 4/2007 Tsujibayashi et al. .... 296/65.09
7,213,861 B2 * 5/2007 Yokoyama et al. ....... 296/65.09

(Continued)

OTHER PUBLICATIONS

International Search Report and Written Opinion for PCT/CA2005/000497 Dated Jul. 21, 2005.

*Primary Examiner*—D. Glenn Dayoan
*Assistant Examiner*—Paul A Chenevert
(74) *Attorney, Agent, or Firm*—Clark Hill PLC (57) ABSTRACT

A seat assembly includes a seat cushion and a pivotally attached seat back movable between a seating position secured to the floor of a vehicle and a stowed position recessed in the floor. A pair of front legs are pivotally attached to the seat cushion and removably attached to a striker assembly in a floor. A pair of rear legs is attached between the seat cushion and the floor. A linkage assembly is coupled between the front legs and rear legs. The linkage assembly includes a lost motion slot for retracting the front legs relative to the seat cushion frame allowing the front legs to pivot between a support position extending between the seat cushion and the floor and a retracted position recess against the seat cushion in response to pivotal movement of the seat cushion between the seating position and the stowed position.

17 Claims, 11 Drawing Sheets

U.S. PATENT DOCUMENTS

| | | | |
|---|---|---|---|
| 7,273,243 B2* | 9/2007 | Prugarewicz | 296/65.09 |
| 2003/0075946 A1* | 4/2003 | Neale et al. | 296/65.09 |
| 2004/0026951 A1* | 2/2004 | Rudberg et al. | 296/65.09 |
| 2004/0100115 A1* | 5/2004 | Rhodes et al. | 296/65.09 |
| 2006/0108822 A1* | 5/2006 | Tame | 296/65.11 |
| 2007/0046074 A1* | 3/2007 | Satta et al. | 297/15 |

* cited by examiner

FOLD IN FLOOR SEAT ASSEMBLY HAVING RETRACTING FRONT LEG LINKAGE ASSEMBLY

BACKGROUND OF THE INVENTION

1. Field of the Invention

The invention relates to a seat assembly for an automotive vehicle having a seat cushion and seat back which are selectively movable between a seating position and a stowed position. More particularly, the invention relates to a seat assembly having a pair of front legs for supporting the seat cushion and a linkage assembly for retracting the front legs in response to movement of the seat assembly from the seating to stowed position.

2. Description of the Related Art

Automotive vehicles include seat assemblies for supporting occupants above a floor in the vehicle. Seat assemblies include a seat cushion and a seat back. Typically, the seat cushion is coupled to the vehicle floor by front and rear legs. The front and rear legs are attached to striker assemblies mounted in the floor for selective attachment to the vehicle floor. It is known that such seat assemblies may be forwardly or rearwardly stowed in recesses in the floor of the vehicle in response to actions performed by an occupant of the vehicle.

For rear seats, it is widely known to provide riser assemblies between the seat cushion and the floor of the vehicle to allow selective tumbling of the seat between a generally horizontal seating position, an upright folded position, and a stowed position within a recess formed in the floor of the vehicle. The front legs of such rear seat assemblies need to be retracted prior to stowing of the seat within the recess in the floor of the vehicle. The refraction system should be robust and allow for repeated movement of the front legs between a seated position for supporting the seat cushion in the horizontal seating position and a retracted position recessed against the bottom of the seat cushion. The retraction system should accommodate movement of the front legs between the retracted position and the seating position when stowed by an occupant without failure of the retraction system.

There is, therefore, a need in the art for a front leg retraction system that is reliable and will accommodate movement of the front legs between retracted and seating positions without failure of the retraction system.

SUMMARY OF THE INVENTION

According to one aspect of the invention, a seat assembly is provided for pivotal movement between a seating position secured to a floor of a motor vehicle and a stowed position recessed with the floor of the vehicle. The seat assembly comprises a seat cushion, a pair of front legs each having a first end pivotally attached to the seat cushion and a second end adapted to be removably attached to a striker assembly in a floor of the vehicle, and a pair of rear legs each having a first end attached to the seat cushion and a second end adapted to be pivotally attached to the floor. A linkage assembly is coupled between the front legs and the rear legs for selectively controlling movement of the front legs between a support position extending from the seat cushion for attachment to the striker assembly and a retracted position lying against the seat cushion. The linkage assembly includes a first link member operatively coupled to the rear leg for controlling movement of the linkage assembly, a second link member extending between a first end operatively coupled to the first link member and an opposite second end, and a third link member having a first end operatively connected to the front leg and a second end operatively coupled to the second end of the second link member. A lost motion connection between the second and third link members automatically allows the front legs to be retracted from the support position to the retracted position in response to pivotal movement of the seat cushion from the seating position to the stowed position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

A seat assembly for use in an automotive vehicle is generally shown at 10 in FIGS. 1-4. The vehicle is generally shown at 12 and includes a support floor 14 having a recessed storage cavity 16 formed in a rear portion thereof. The recessed storage cavity 16 includes vertical side walls (not shown) spaced apart by vertical front and rear walls 22, 24 that are interconnected by a lower floor portion 26.

Figure 1:
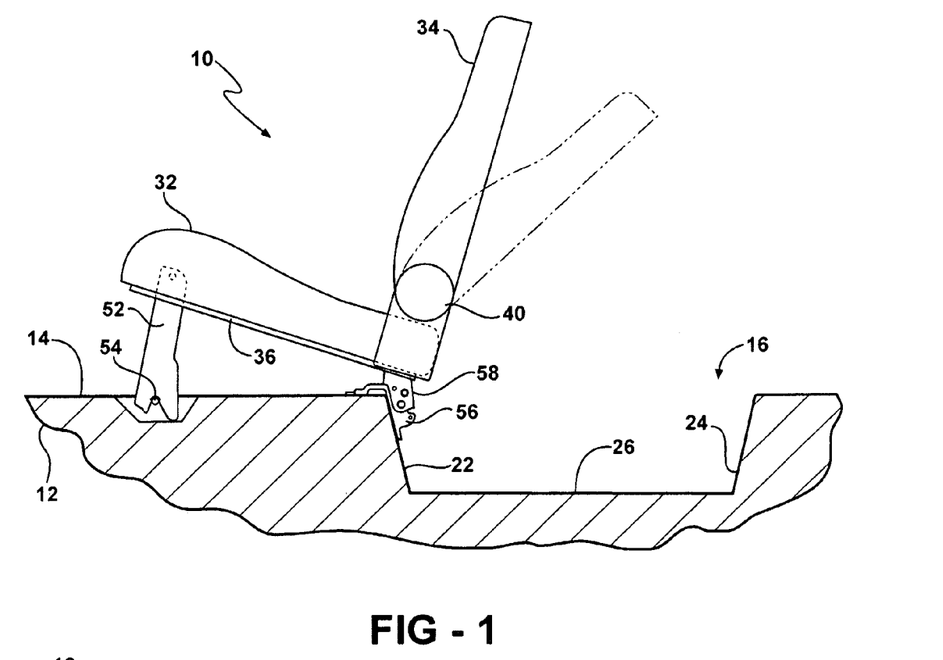
FIG. 1 is a schematic side view of an automotive vehicle seat assembly in a seating position.
Figure 2:
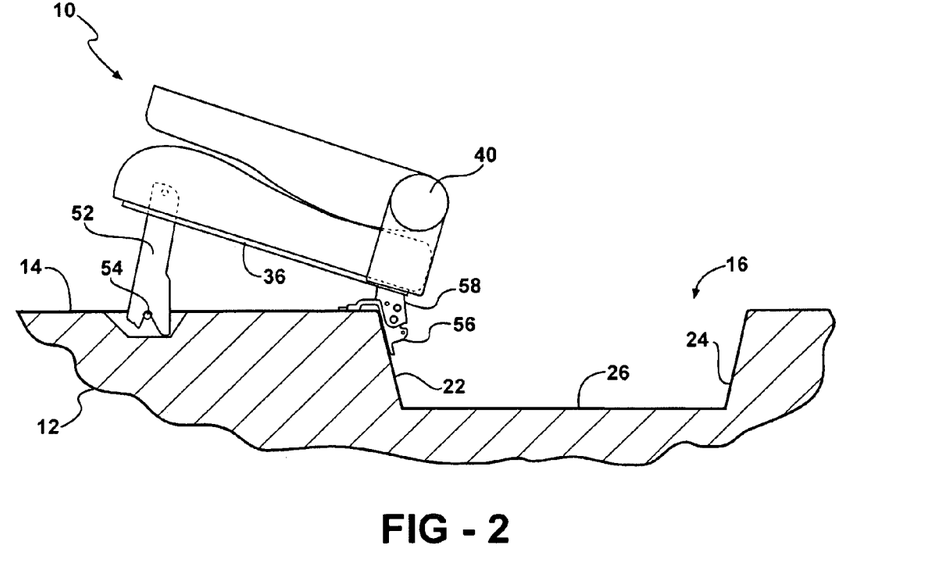
FIG. 2 is a schematic side view of the seat assembly with the seat back in a folded position.

The seat assembly 10 includes a seat cushion 32 and a seat back 34. The seat cushion 32 includes a cushion frame 36 and the seat back 34 includes a back frame (not shown). A recliner mechanism 40 is coupled to and between the cushion frame 36 and the back frame. The recliner mechanism 40 allows pivotal adjustment of the seat back 34 relative to the seat cushion 32 between a plurality of generally upright seating positions, as best shown in FIG. 1, and a non-seating, forwardly folded position overlying the seat cushion 32, as shown in FIG. 2. The recliner mechanism 40 may be any type as is commonly known to one skilled in the art. In the preferred embodiment of the invention, the recliner mechanism 40 is of the type disclosed in Applicant's U.S. Pat. No. 6,312,053, which is incorporated herein by reference in its entirety.

Figure 3:
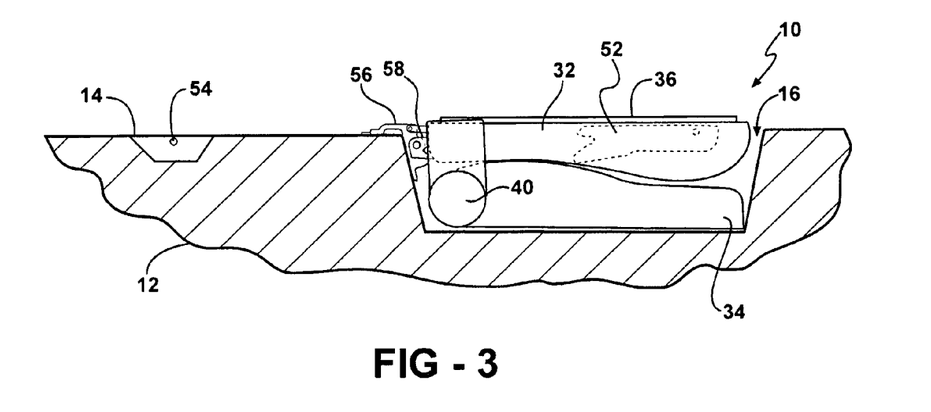
FIG. 3 is a schematic side view of the seat assembly in a stowed position recessed in a rear storage cavity within the vehicle floor.
Figure 4:
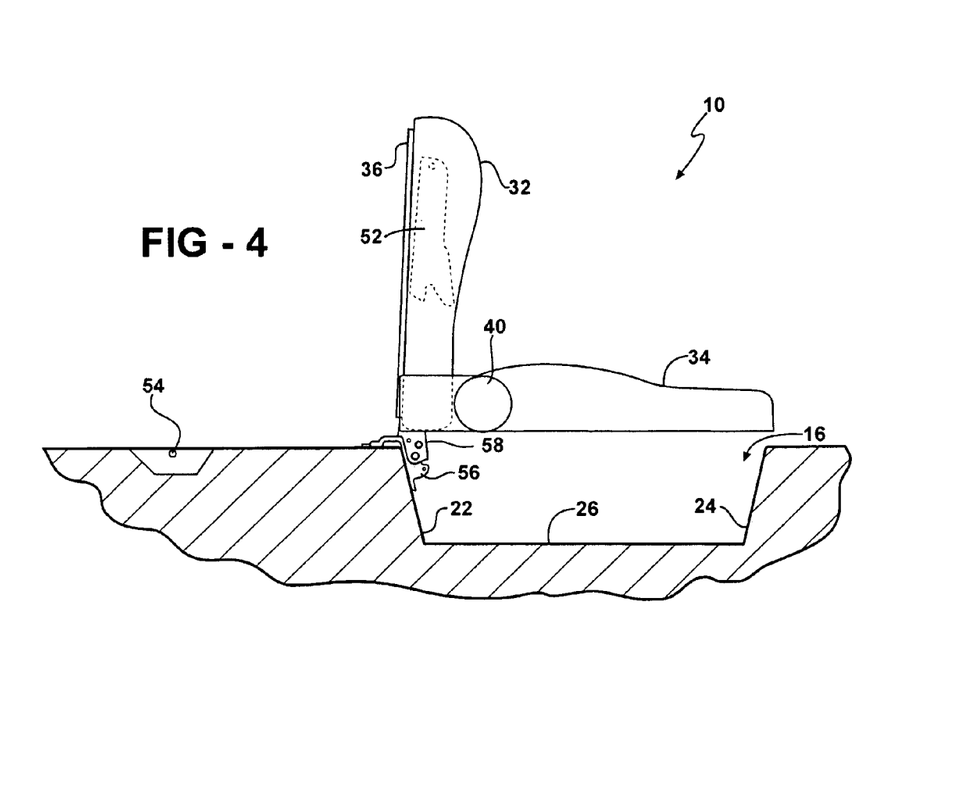
FIG. 4 is a schematic side view of the seat assembly in a rearward facing tailgate position.

Again referring to FIGS. 1-4, the seat assembly 10 is shown in various positions within a vehicle 12. FIG. 1 shows the seat assembly 10 having the seat back 34 and seat cushion 32 in a seating position, with the seat cushion 32 positioned generally horizontal relative to the floor 14 of the vehicle 12. FIG. 2 shows the seat assembly 10 in a folded position with the seat back 34 folded forwardly overlying the seat cushion 32. FIG. 3 shows the seat assembly 10 in a stowed position wherein the seat assembly 10 is disposed within the recessed cavity 16 formed in the floor 14 of the vehicle 12. And, FIG. 4 shows the seat assembly 10 in a rearward facing tailgate position wherein the seat back 34 and seat cushion 32 positions are reversed relative to the seating position outlined above.

The seat assembly 10 includes front legs 52 that are removeably attached to strikers 54 (see FIG. 5) attached to the floor 14 of the vehicle 12. The seat assembly 10 further includes pivot brackets 56 fixedly secured to the floor 14 of the vehicle 12 adjacent the storage cavity 16 and rear legs 58 pivotally coupled between the seat assembly 10 and pivot brackets 56. The rear legs 58 provide for pivotal movement of the seat assembly 10 to the stowed position, as shown in FIG. 3 or to the rearward facing tailgate position, as shown in FIG. 4. The pivot brackets 56 and rear legs 58 are further described and disclosed in Applicant's Published U.S. application Ser. No. 6,837,530, which is incorporated herein by reference in its entirety.

Figure 5:
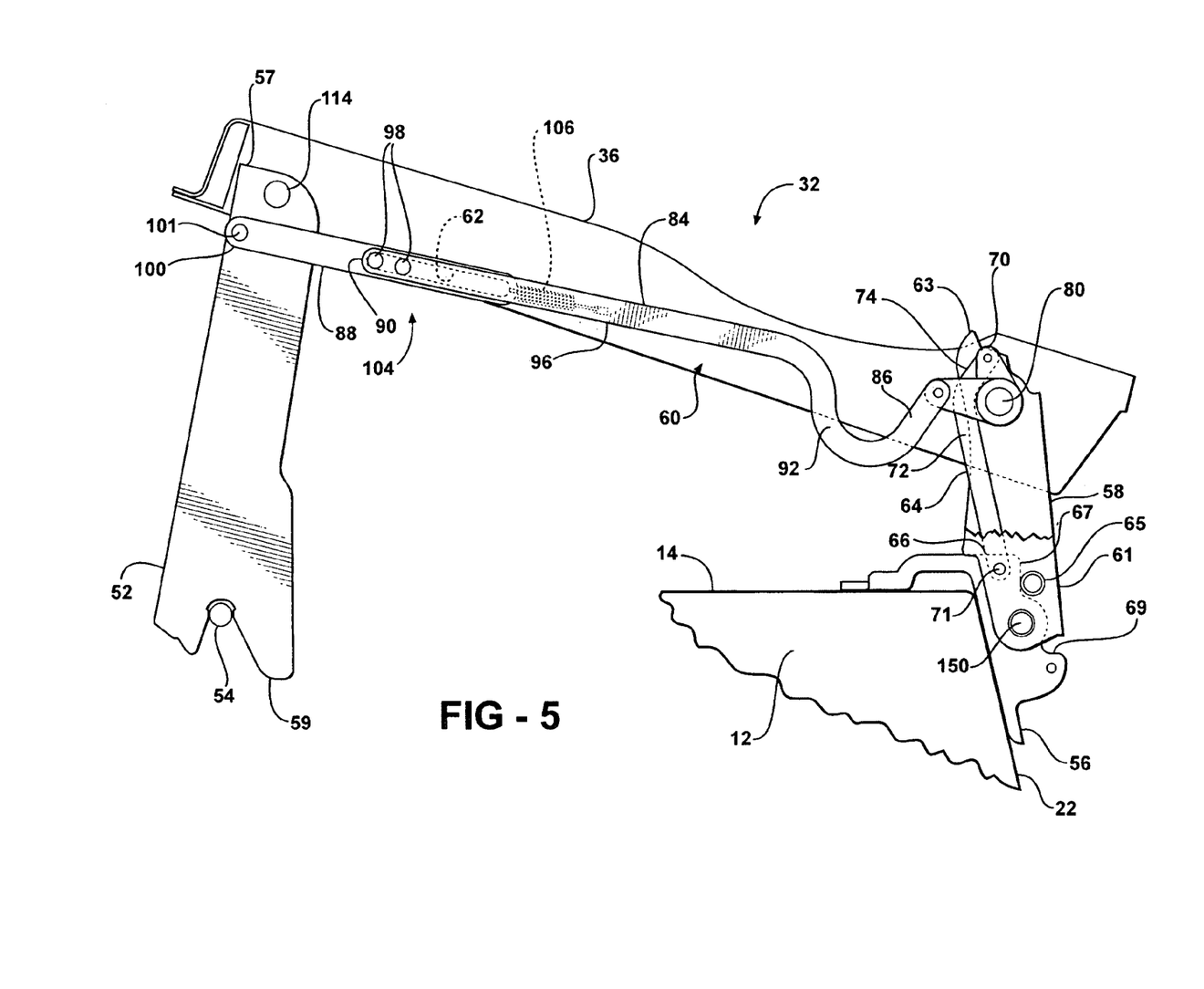
FIG. 5 is a partial side view showing the seat assembly including a linkage assembly in the seated position.
Figure 6:
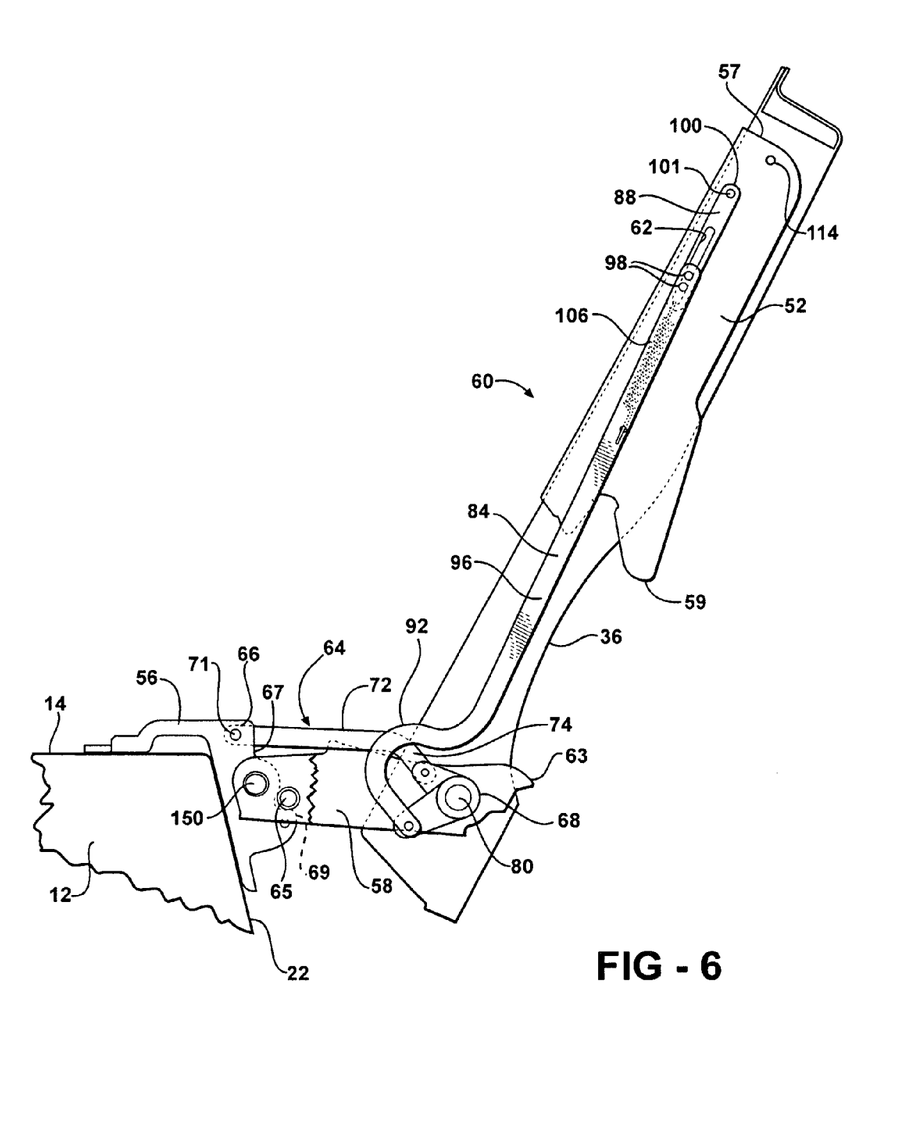
FIG. 6 is a partial side view showing the seat assembly including the linkage assembly in a vertically pivoted position.
Figure 7:
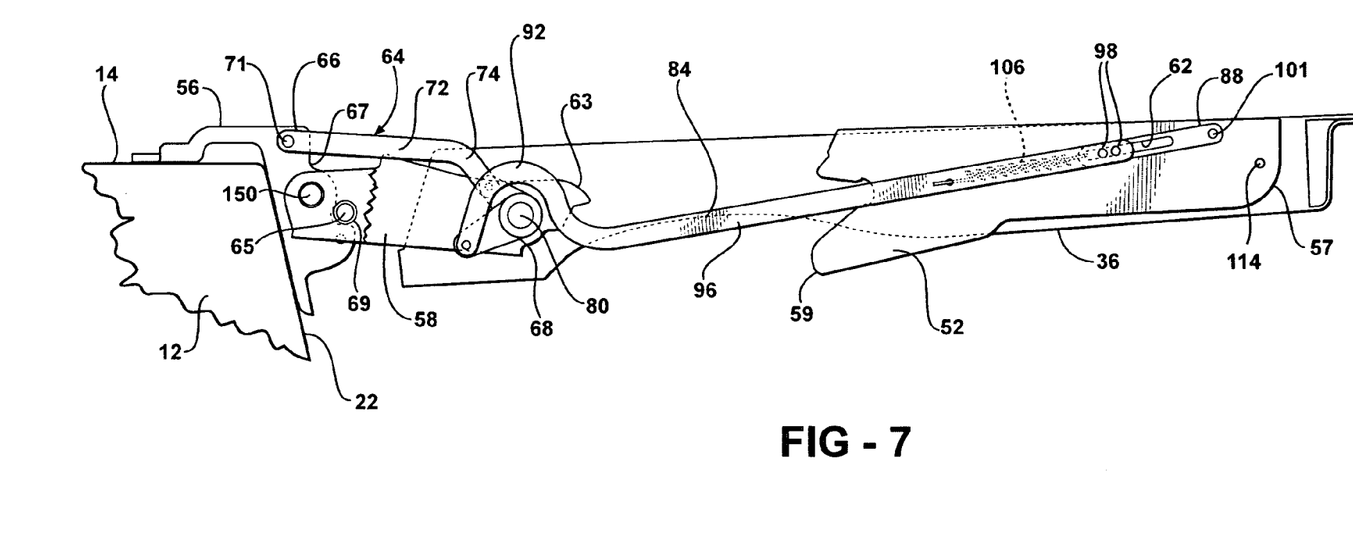
FIG. 7 is a partial side view showing the seat assembly including the linkage assembly in the stowed position.
Figure 14:
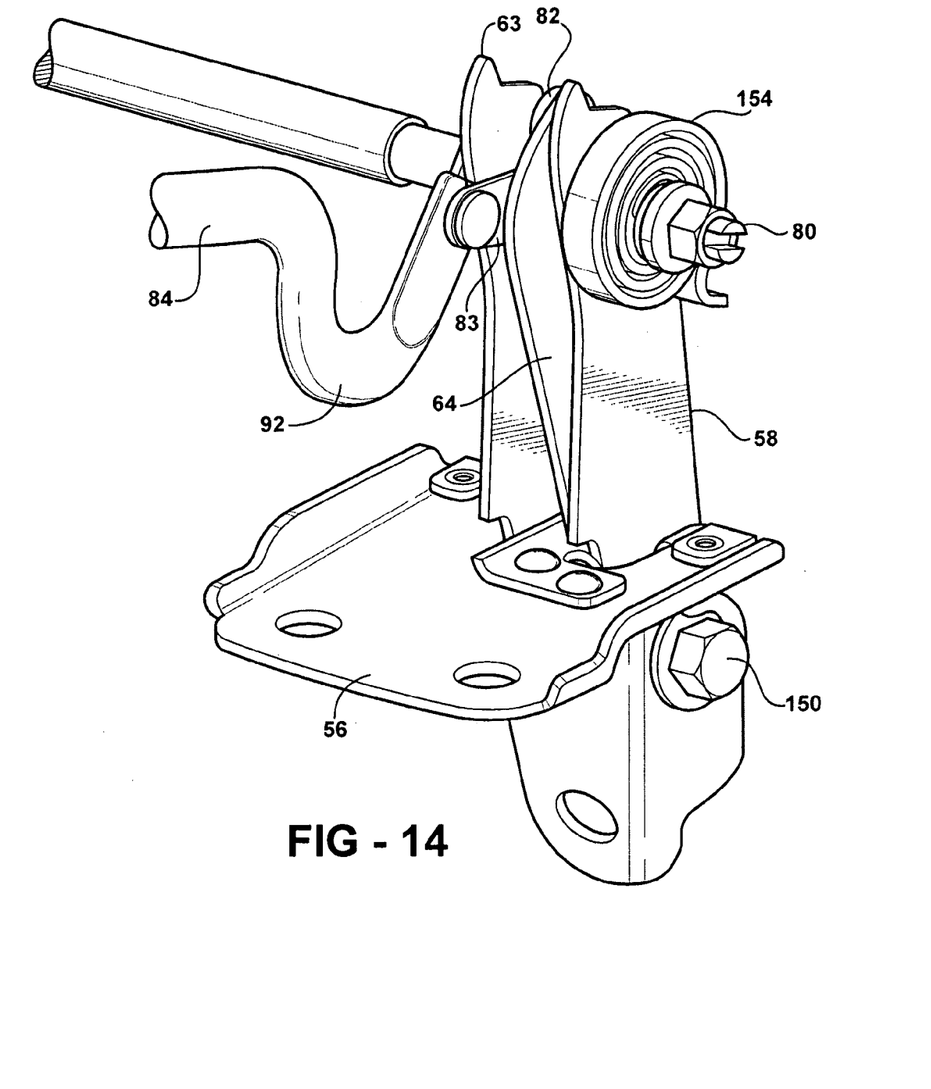
FIG. 14 is a partial perspective view detailing the first and second rear pivot points of the linkage assembly of the alternative embodiment.

Referring to FIGS. 5-7, the front legs 52 include a first end 57 pivotally coupled to the seat cushion frame 36 by a pivot rod 114 for pivotal movement between a support position, extending from the seat cushion 32 to the floor 14 of the vehicle 12 for supporting the seat assembly 10 in the seating position, and a retracted position recessed against the bottom or underside of the seat cushion 32. The front legs 52 further include a second distal end 59 for carrying a latch mechanism (not shown) to latch the front legs 52 to the strikers 54 in the floor 14 of the vehicle 12 in the support position as is commonly known to one skilled in the art. The rear legs 58 extend between a second end 61 pivotally coupled to the pivot bracket 56 by a first rear pivot or free pivot 150 and a first end 63 pivotally coupled to the seat cushion frame 36 by pivot rod 80 for moving the seat assembly 10 between each of the seating position, tailgate position and stowed position. A clock spring 154, as shown in FIG. 14, is disposed about the pivot 80 and engagable between the rear legs 58 and seat cushion frame 36 for biasing the seat assembly 10 forward to the seating position. The rear legs 58 further include a stop pin 65 engagable with upper and lower recesses 67, 69 formed in the pivot bracket 56 for positioning and defining the seat assembly 10 in each of the seating and stowed positions, respectively. Referring to FIGS. 5-7, there is shown the seat cushion frame 36 and a linkage assembly 60 of the present invention in various positions relative to the floor 14 of the vehicle 12. FIG. 5 shows the cushion frame 36 and linkage assembly 60 in the seating position corresponding to that of FIG. 2. FIG. 6 shows the cushion frame 36 and linkage assembly 60 pivoted about the pivot brackets 56 and in a vertical position relative to the floor 14 of the vehicle 12. FIG. 7 shows the seat cushion frame 36 and linkage assembly 60 in the stowed position corresponding to the stowed position of FIG. 3 within the recessed cavity 16 formed in the floor 14 of the vehicle 12.

Figure 8:
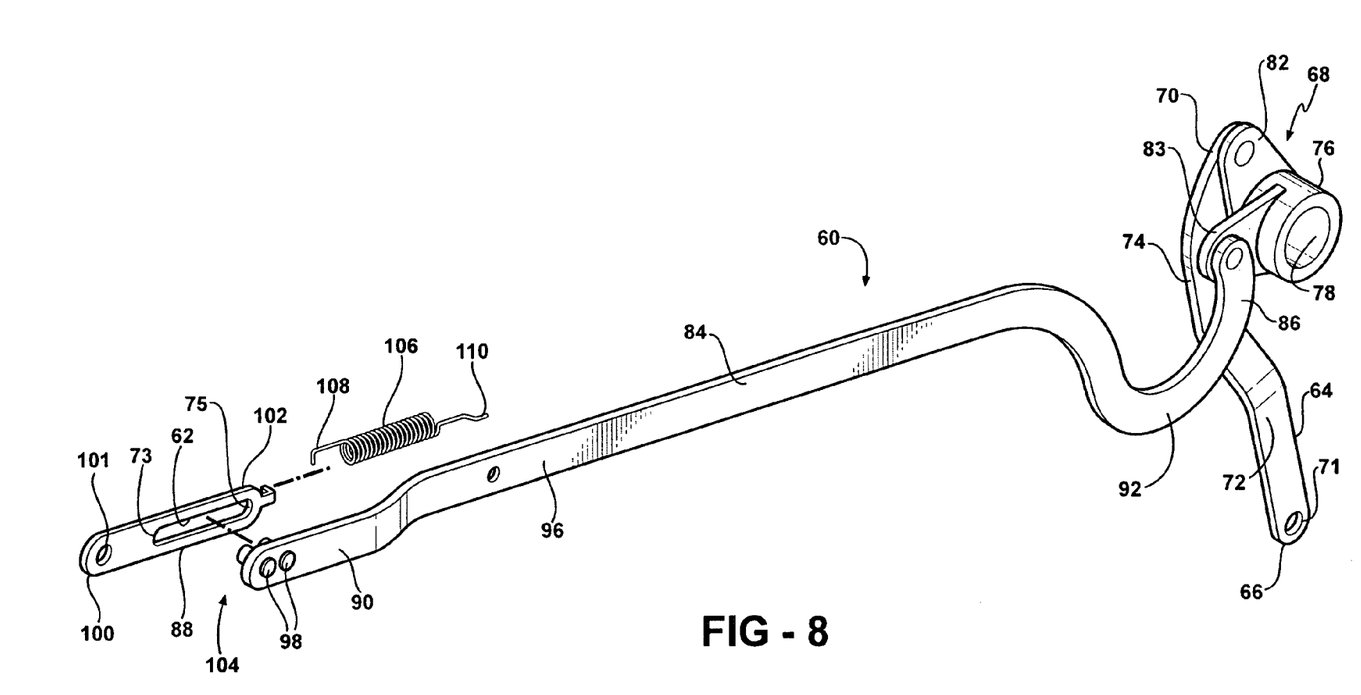
FIG. 8 is a perspective view of the linkage assembly of the present invention.
Figure 9:
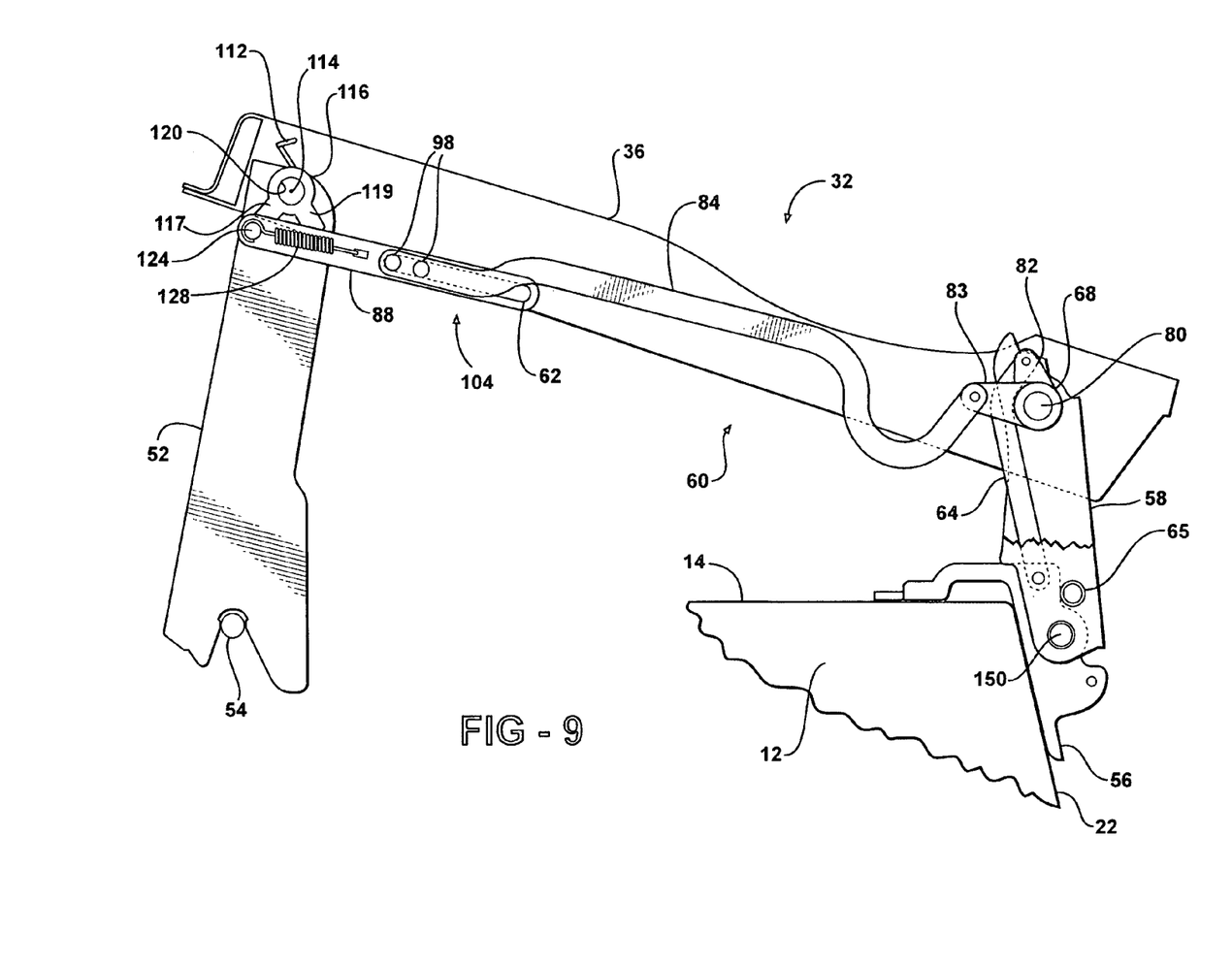
FIG. 9 is a partial side view showing an alternative embodiment of the seat assembly including a linkage assembly in the seated position.

Referring to FIG. 8, the linkage assembly 60 includes a bell crank 68 comprising a cylindrical body 76 having a bore 78 formed along a center axis of the cylindrical body 76. The bore 78 allows the bell crank 68 to be rotatably mounted about the pivot rod 80 on the seat cushion frame 36. The bell crank 68 also includes two spaced apart arms 82, 83 extending radially from the cylindrical body 76.

The linkage assembly 60 preferably comprises multiple interconnected link members for retracting and extending the front legs 52 between the support and retracted positions in response to pivotal movement of the seat cushion 32. The multiple link members include a first link member 64 having a second end 66 pivotally connected to the pivot bracket 56 at pivot 71 and a first end 70 pivotally connected to the arm 82 of bell crank 68. The first link member 64 comprises a linear portion 72 extending from the second end 66 and terminating at an arcuate portion 74 at the first end 70. The arcuate portion 74 is shaped to allow for pivotal travel of the first link member 64 about the bell crank 68, as will be discussed in more detail below.

A second link member 84 includes a first end 86 pivotally connected to the arm 83 of the bell crank 68 and a second opposite end 90 slidably coupled with a third link member 88, as will be discussed in more detail below. The second link member 84 includes an arcuate portion 92 at the first link end 86 for allowing travel and clearance about the bell crank 68, and a linear portion 96 extending towards the second end 90. A pair of pins 98 are attached to and project from the second link member 84 adjacent the second end 90 of the second link member 84.

The third link member 88 includes a first end 100 pivotally attached to the front leg 52 at pivot 101 and extends outward to a portion having a lost motion slot 62 formed on a second end 102. The lost motion slot 62 extends longitudinally between first 73 and second 75 ends and slidably receives the pins 98 of the second link member 84 therebetween defining a lost motion connection 104. The lost motion connection 104 allows the front legs 52 to retract to the stowed position relative to the seat cushion frame 36 when the seat cushion 32 is pivoted about the rear legs 58 from the seating position to the stowed position within the recessed cavity 16 in the floor 14.

A tension spring 106 includes a first end 108 attached to the third link member 88 and a second end 110 attached to the second link member 84. The tension spring 106 biases the front legs 52 to the stowed position relative to the seat cushion frame 36. The tension spring 106 also reduces vibrations and rattles associated with the linkage assembly 60.

In an alternative embodiment shown in FIGS. 9-14, the tension spring 106 is replaced with a torsion spring 112 positioned about the pivot 114 of the front legs 52. The torsion spring 112 biases the front legs 52 to the stowed position relative to the seat cushion frame 36, as well as reduces the vibrations associated with the linkage assembly 60.

Referring to the alternative embodiment shown in FIGS. 9-14, a fourth link member 116 is shown disposed about the front leg pivot 114. The fourth link 116 comprises a planar body 118 having a first through-bore 120 formed therein for mounting about the front leg pivot 114 and angularly spaced arms 117, 119 extending outwardly from the planar body 118. The arms 117, 119 engage a stop pin 121 attached to the front legs 52 and seated between the arms 117, 119 for pivoting the front legs 52 about the pivot 114. A pin 124 joins the third link member 88 to one arm 117 of the fourth link member 116. The fourth link member 116 produces a longer moment arm compared to the third link member 88 of the first embodiment; thereby increasing the mechanical advantage of the linkage assembly 60.

Figure 10:
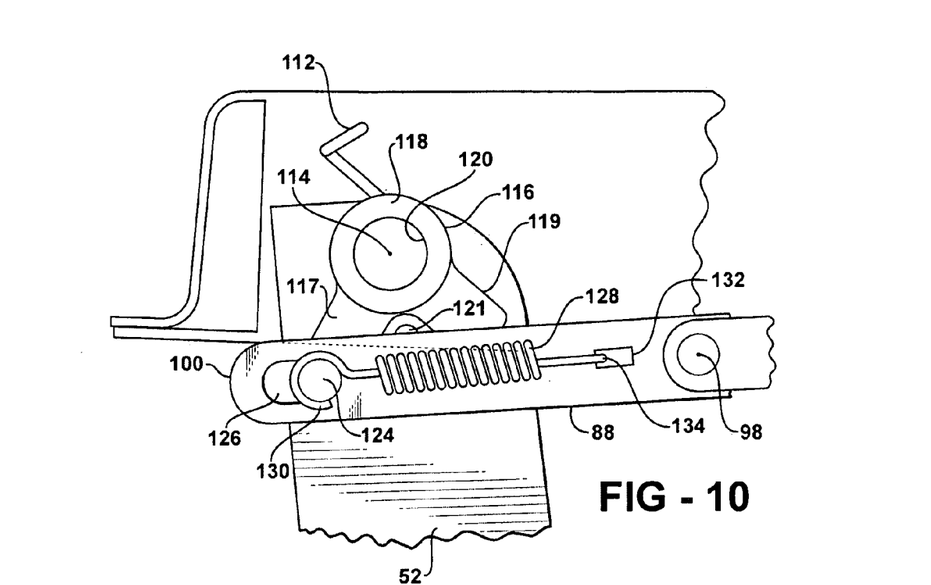
FIG. 10 is an enlarged partial side view of the alternative embodiment of the seat assembly including a fourth link in the seated position.
Figure 11:
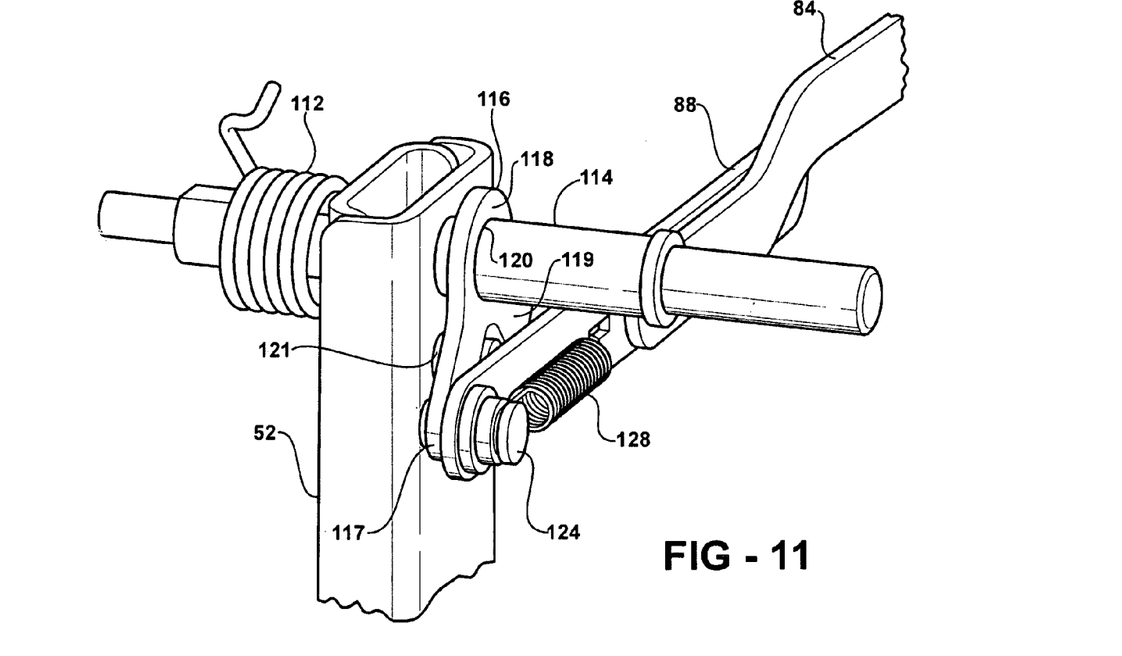
FIG. 11 is an enlarged perspective view of the alternative embodiment showing the fourth link disposed about a front leg pivot.
Figure 12:
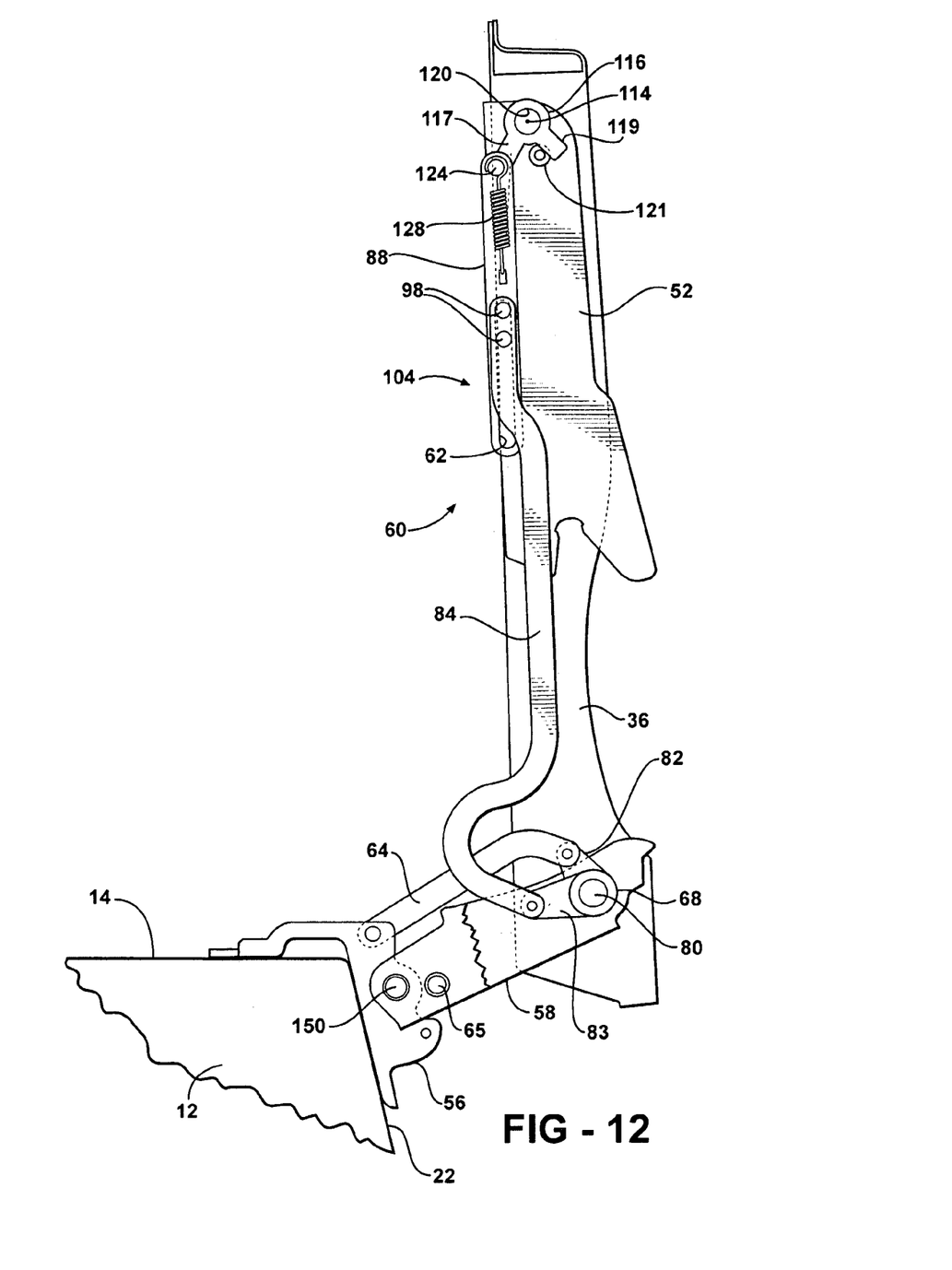
FIG. 12 is a partial side view of the alternative embodiment showing the seat assembly in a vertically pivoted position with the linkage assembly fully extended.

In the alternative embodiment, the third link member 88 includes an elongated slot 126 positioned proximate the first end 100 of the third link member 88 that receives the pin 124 joining the third and fourth link members 88, 116. The elongated slot 126 allows for variations in the position of the front legs 52 in relation to the strikers 54 in the floor 14, assuring secure attachment of the front legs 52 with the strikers 54 when the seat assembly 10 is in the seating position. The third link member 88 also includes an extension spring 128 having a first end 130 attached to the pin 124 and a second end 134 attached to a spring slot 132 formed in the third link member 88. The extension spring 128 positions the pin 124 within the elongated slot 126, and allows for adjustment of the front legs 52 relative to the striker 54.

In operation, the seat assembly 10 can be moved from the seating position, shown in FIG. 1, to a position where the seat back 34 is collapsed or folded down on the seat cushion 32, as shown in FIG. 2, by actuating the recliner mechanism 40. The front legs 52 can then be released from the strikers 54 by a release mechanism, as is commonly known in the art. Once the front legs 52 are released from the strikers 54, the seat assembly 10 may be moved to the stowed position, shown in FIG. 3, by moving the seat cushion 32 about the rear legs 58 attached to the pivot brackets 56. Alternatively, the seat back 34 may be maintained in the seating position, and the front legs 52 released from the strikers 54 to move the seat assembly 10 to the tailgating position shown in FIG. 4.

When the front legs 52 are released from the strikers 54, the tension spring 106 or torsion spring 112 of the first and alternative embodiments, urges the front legs 52 to pivot about the front leg pivot point 114 to the stowed position relative to the seat cushion frame 36. As the seat cushion 32 is raised, the seat cushion frame 36 pivots about the first rear pivot 150 at the connection of the rear legs 58 and pivot brackets 56. The second rear pivot is provided by the connection of the pivot rod 80 between the seat cushion frame 36 and rear legs 58. The clock spring 154 disposed about the pivot rod 80 ensures selective pivoting about the first rear pivot 150 at the outset of motion of the seat cushion 32, as opposed to the pivot rod 80. The first link member 64, attached to the pivot brackets 56 and bell crank 68, causes counter-clockwise rotation of the bell crank 68 in response to pivotal movement of the seat cushion 32. The second link member 84, also connected to the bell crank 68, rotates counter-clockwise as well, causing the pins 98 of the second link member 84 to move or slide rearward in the lost motion slot 62 formed in the third link member 88. This arrangement allows the front legs 52 to be retracted, before complete pivoting of the seat cushion 32 to the stowed position in FIG. 3, as the lost motion slot 62 allows continued travel of the linkage assembly 60 without binding.

Continued rotation of the seat cushion 32 about the first rear pivot 150 continues until the rear legs 58 intersect the pivot brackets 56 and the stop 65 engages the recess 69 in a stop position, shown in FIG. 6. At this stop position, the front legs 52 are retracted and stowed relative to the seat cushion frame 36 due to the assist springs 106, 112, as well as the force of gravity on the front legs 52 as the seat cushion 32 is tilted about the rear legs 58.

Continued movement of the seat cushion 32 causes pivoting of the seat cushion frame 36 about the pivot rod 80 against the bias of the clock spring 154 due to the inability to pivot about the first rear pivot 150, as shown in FIGS. 6 and 7. The continued rotation of the seat cushion frame 36 causes the second link 84 to nest about the bell crank 68, as shown in FIG. 7. Additionally, there is continued movement of the pins 98 in the lost motion slot 62 of the third link 88, until the seat assembly 10 is in the stowed position within the recessed cavity 16. When in the stowed position, the front legs 52 can be moved by an occupant of the vehicle towards the extended support position against the biasing force of the springs 106, 112, without damaging the linkage assembly 60.

Figure 13:
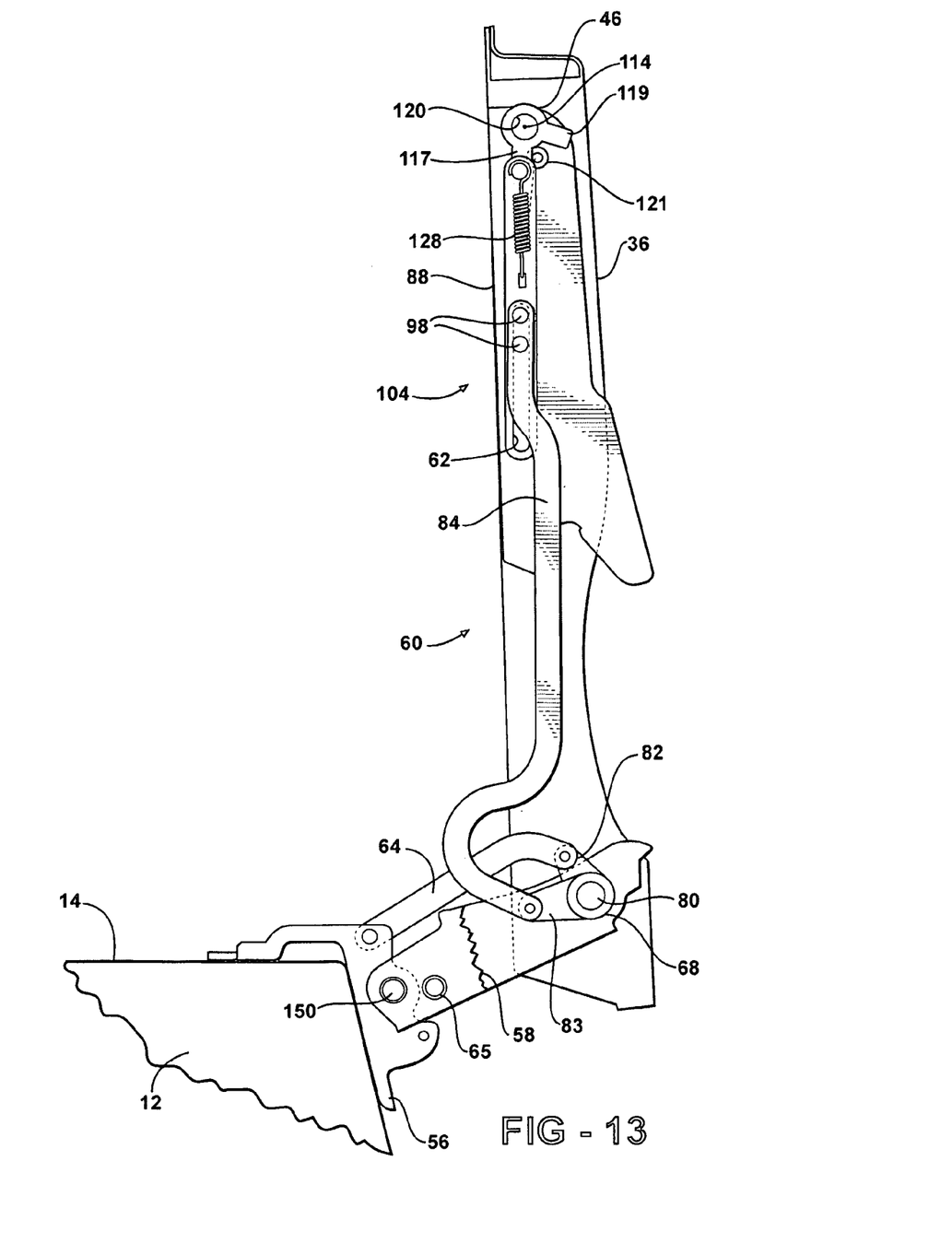
FIG. 13 is a partial side view of the alternative embodiment showing the seat assembly in a vertically pivoted position with the linkage assembly fully retracted.

In the alternative embodiment, the fourth link member 116 pivots about the front leg pivot 114 in response to movement of the third link's 88 movement, as shown in FIG. 13. The fourth link member 116 moves without engaging the stop 121 disposed on the front legs 52 until the front legs 52 are moved to the retracted or stowed position relative to the cushion frame 36. As with the first embodiment, the assist spring 112 and force of gravity urges the front legs 52 to the stowed position relative to the seat cushion frame 36.

When the seat assembly 10 is returned from the stowed position to the seating position, a reverse of the above-described events occurs. First the seat cushion 32 pivots about the pivot rod 80, and then the first rear pivot 150 towards the seating position. The pins 98 of the second link 84 move forward in the lost motion slot 62 until they contact the first end 73 of the lost motion slot 62; thereby urging the front legs 52 into positive position to engage the strikers 54. In the first embodiment, the third link 88 is connected to the front leg 52, such that engagement of the pins 98 with the first end of the slot 62 cause the front legs 52 to move from the retracted or stowed position relative to the seat cushion frame 36 to the support position. In the alternative embodiment, the fourth link member 116 pivots about the front leg pivot 114 from the position in FIG. 13 to the position in FIG. 12, where one of the arms 119 of the fourth link 116 engages the stop 121 of the front leg 52 causing the front leg 52 to move from the stowed position relative to the cushion frame 36 to the seating position.

In the alternative embodiment, the third link 88 is connected to the fourth link 116 by the pin 124 for moving the front legs 52 towards the support position and engagement with the strikers 54. To ensure engagement with the strikers 54, the third link member 88 includes an elongated slot 126 positioned proximate the first end 100 of the third link member 88 that receives the pin 124 joining the third and fourth link members 88, 116. The pin 124 is positioned within the elongated slot 126 by the extension spring 128 allowing for variations in the position of the front legs 52 with respect to the strikers 54.

Therefore, the pins 98 of the second link member 84 disposed in the lost motion slot 62, position the front legs 52 when moving from the stowed position to the seating position, but travel without contacting an end of the lost motion slot 62 when the seat assembly 10 is moved from the seating to the stowed position.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A seat assembly adapted for pivotal movement between a seating position secured to a floor of a motor vehicle and a stowed position recessed with the floor of the vehicle, said seat assembly comprising:
    a seat cushion;
    a pair of front legs each having a first end pivotally attached to said seat cushion and a second end adapted to be removably attached to a striker assembly in the floor of the vehicle;
    a pair of rear legs each having a first end attached to said seat cushion and a second end adapted to be pivotally attached to the floor; and
    a linkage assembly coupled between said front legs and said rear legs for selectively controlling movement of said front legs between a support position extending from said seat cushion for attachment to the striker assembly and a retracted position lying against said seat cushion, said linkage assembly including a first link member operatively coupled to said rear leg for controlling movement of said linkage assembly, a second link member extending between a first end operatively coupled to said first link member and an opposite second end, a third link member having a first end operatively connected to said front leg and a second end operatively coupled to said second end of said second link member, and a lost motion connection between said second and third link members for automatically allowing said front legs to be retracted from said support position to said retracted position in response to pivotal movement of the seat cushion from said seating position to said stowed position.

2. The seat assembly as set forth in claim 1 wherein said lost motion connection includes an elongated slot formed in one of said second and third link member for receiving and guiding at least one guide pin projecting from the other one of said second and third link member for allowing said third link member to move relative to said second link member to automatically retract said front legs from said support position to said retracted position.

3. The seat assembly as set forth in claim 2 wherein said linkage assembly includes a bell crank rotatably coupled between said rear legs and said seat cushion for coupling and operatively controlling said first and second link members.

4. The seat assembly as set forth in claim 3 wherein said bell crank includes a cylindrical body having a bore therethrough for receiving a pivot rod to rotatably couple said rear legs and said seat cushion.

5. The seat assembly as set forth in claim 4 wherein said bell crank includes first and second spaced apart crank arms extending radially from said cylindrical body.

6. The seat assembly as set forth in claim 5 further including a pivot bracket for pivotally supporting said rear legs and adapted to fixedly secure said seat assembly to the floor of the vehicle.

7. The seat assembly as set forth in claim 6 wherein said first link member extends between a first end pivotally coupled to said first crank arm and a second end pivotally coupled to said pivot bracket for rotating said bell crank about said pivot rod upon rotation of said seat assembly between said support position and said stowed position.

8. The seat assembly as set forth in claim 7 wherein said first end of said second link member is pivotally coupled to said second crank arm for controlling sliding movement of said guide pin along said elongated slot of said lost motion connection in response to rotation of said bell crank by said first link member.

9. The seat assembly as set forth in claim 8 wherein said rear legs include a stop pin for engaging with upper and lower recesses formed in said pivot bracket for positioning and supporting said rear legs against said pivot bracket in each of said support and stowed positions.

10. The seat assembly as set forth in claim 9 including a coil spring coupled about said pivot rod between said seat cushion and said rear legs for biasing said seat assembly toward said seating position.

11. The seat assembly as set forth in claim 10 wherein said lost motion connection includes a tension spring coupled between said second link member and said third link member for continuously biasing said front legs toward said retracted position.

12. The seat assembly as set forth in claim 10 further including a fourth link member pivotally coupled to said front legs and said seat cushion by a pivot rod and operatively coupled to said first end of said third link for controlling said pivotal movement of said front legs between said support position and said stowed position.

13. The seat assembly as set forth in claim 12 wherein said fourth link member includes a planar body having a bore for receiving said pivot rod therethrough and angularly spaced first and second arms extending radially from said body.

14. The seat assembly as set forth in claim 13 wherein said front legs include a stop pin projecting therefrom and seated between said first and second arms of said fourth link member for engagement therewith to control said pivotal movement of said front legs between said support and retracted positions.

15. The seat assembly as set forth in claim 14 wherein said first end of said third link member is pivotally coupled to said first arm of said fourth link member to rotate said fourth link into engagement with said stop pin and control said pivotal movement of said front legs.

16. The seat assembly as set forth in claim 15 wherein said first end of said third link member includes an elongated slot for receiving a guide pin therethrough to slidably connect said third link member to said first arm of said fourth link member and provide alignment of said front legs with the striker assembly.

17. The seat assembly as set forth in claim 16 further including a torsion spring coupled between said seat cushion and said front legs for biasing said front legs toward said support position.

* * * * *